United States Patent [19]

Lee

[11] Patent Number: 5,215,693
[45] Date of Patent: Jun. 1, 1993

[54] METHOD FOR FORMING MACHINABLE UNFIRED CERAMIC COMPACTS

[75] Inventor: Howard H. Lee, Bloomfield Hills, Mich.

[73] Assignee: General Motors Corporation, Detroit, Mich.

[21] Appl. No.: 781,629

[22] Filed: Oct. 23, 1991

[51] Int. Cl.⁵ .............................................. C04B 41/83
[52] U.S. Cl. ...................................... 264/62; 264/63; 264/67; 264/128; 264/133
[58] Field of Search ...................... 264/63, 62, 67, 128, 264/133

[56] References Cited

U.S. PATENT DOCUMENTS

| | | | |
|---|---|---|---|
| 3,056,704 | 10/1962 | Rothweiler | 264/128 |
| 3,953,562 | 4/1976 | Hait et al. | 264/343 |
| 4,045,412 | 8/1977 | Yamada et al. | 264/63 |
| 4,127,629 | 11/1978 | Weaver et al. | 264/63 |

FOREIGN PATENT DOCUMENTS 55-114522  9/1980  Japan .................................. 264/67

OTHER PUBLICATIONS

Teter "Binders for Machinable Ceramics", In Ceramic Age 82 [8] 1966, pp. 30–32.

Primary Examiner—James Derrington
Attorney, Agent, or Firm—George A. Grove; Domenica N. S. Hartman

[57] ABSTRACT

A method is provided for forming machinable ceramic compacts, which are in the unfired, preconsolidated condition. The method of this invention adds the binder to the ceramic powder mixture after the compact is formed by compaction, as opposed to conventional practice wherein the binder is added to the mixture prior to compaction. The unfired ceramic compacts which are formed by the method of this invention are characterized by high strength, excellent durability and enhanced machinability.

8 Claims, No Drawings

METHOD FOR FORMING MACHINABLE UNFIRED CERAMIC COMPACTS

The present invention generally relates to the manufacturing of ceramic components, and more particularly to the "green" compacts which are the unfired, preconsolidated forms of these ceramic components. Even more particularly, this invention relates to the manufacture of a machinable, unfired ceramic compact which is first compressed and then appropriately impregnated with a water insoluble binder, so as to most effectively enhance the cohesive forces within the compact thereby providing exceptional strength and machinability to the unfired ceramic compact.

BACKGROUND OF THE INVENTION

Ceramic components are used extensively throughout many industries and have been formed in a variety of complex shapes. Typically these complex shapes must be machined after the ceramic component is fully, or at least partially, fired and therefore in an extremely hard condition, since the unfired ceramic compact is typically too soft to withstand extensive machining. The machining of the partially or fully fired ceramic component is expensive and difficult because of the hard brittle nature of the ceramic material after firing, even after only partial firing.

Generally, a ceramic component is formed by first compacting an appropriate powder mixture so as to form a ceramic green compact which resembles the desired shape of the component, and then firing the green compact at the appropriate temperature to consolidate and vitrify the ceramic powders.

Typically, an organic binder is included within the ceramic powder mixture prior to forming the green compact, so as to help consolidate the powder mixture during compaction. The addition of a binder has been necessary to provide sufficient strength to the unfired green compact, so as to facilitate the subsequent handling and/or machining of the compact before firing of the compact. The types of binders which have been routinely employed include dry, flaky binders or liquified binders. These binders have been added to the ceramic powders before the powders are blended so as to ensure intimate commingling between the ceramic powder and the binder.

If a dry binder is employed within the ceramic powder mixture, various consolidation operations may be used, such as dry pressing, high energy compaction or vibratory packing. These dry pressing techniques have required the addition of a binder before powder compaction so as to promote die lubrication and powder deformability during pressing. In addition, the binder provides the pressed compact with some strength for subsequent handling, prior to densification of the compact during firing. However, despite the thorough mixing of the binder and powders, the particles do not always uniformly consolidate. Therefore the density of the unfired, green compacts formed from these dry binder operations may vary considerably. Further, even though the binder provides some enhancement of strength within the compact, the compact still can not tolerate any type of machining other than gentle surface polishing or light machining, which unduly limits the use of these ceramic components to relatively simple shapes.

Alternatively, a liquified binder may be mixed with the powder mixture. With a liquified binder, the ceramic powders may be consolidated by techniques such as injection molding, slip casting or filter-pressing. The binder has been necessary when using these wet compaction techniques, so as to promote sufficient deflocculation of the powders within the liquid mixture and/or to promote fluidity of the powders. In addition, the binder provides a degree of strength to the compact for subsequent handling and light machining prior to firing, however complex machining of the compact is precluded due to the insufficient strength of the compact.

Therefore, although the use of binders for enhanced compaction of the ceramic powder mixtures is well entrenched within the ceramic processing industry, it is apparent that these conventional manufacturing processes are less than ideal, particularly since the traditional unfired compacts can not withstand significant amounts of machining. Thus, it would be desirable to provide an unfired, ceramic compact which is sufficiently strong and rugged to withstand machining into complex shapes. Further, it would be desirable to provide a method for forming these types of machinable, unfired ceramic compacts, wherein the binder can be uniformly distributed in those regions of the compact where the presence of binder is desired, such as for enhanced machinability.

SUMMARY OF THE INVENTION

It is therefore an object of this invention to provide a method for forming a machinable, unfired ceramic compact, wherein the compact possesses sufficient strength to withstand complex machining operations prior to the densification and vitrification of the ceramic compact during a subsequent firing step.

It is a further object of this invention that such a method include the addition of an appropriate binder to the unfired ceramic compact after consolidation of the powdered ceramic mixture, thereby allowing for the addition of the binder to a localized region of the compact for enhanced strength and machinability of the compact at that localized region.

Still further, it is an object of this invention that the ceramic compacts formed by such a method be characterized by superb shape retention even after machining, as compared to conventionally prepared compacts.

In accordance with a preferred embodiment of this invention, these and other objects and advantages are accomplished as follows.

According to the present invention, there is provided a method for forming a machinable, ceramic green compact which is the unfired, preconsolidated form of a ceramic component. The method of this invention adds the binder to the ceramic compact after it is formed by compaction, as opposed to conventional practice wherein the binder is added to the mixture prior to compaction. The unfired ceramic compacts which are formed by the method of this invention are characterized by high strength, excellent durability and enhanced machinability.

Generally, an unfired, green compact having a shape corresponding nearly to the shape of the desired ceramic component, is formed by first compacting a ceramic powder mixture. The ceramic powder mixture may contain only the ceramic powder or it may contain other components such as a binder or dispersant. Next a water insoluble binder, in liquid form, is introduced into the compact. The liquid binder is either locally or uniformly distributed within the compact, depending on the particular application for the ceramic component. If overall machining of the compact is required, the binder will be introduced throughout the compact probably by immersion within the binder, whereas if only a selected region of the compact requires strength and ruggedness for machining, the binder will be introduced locally to that region.

The compact may be impregnated with the liquid binder while it is still within its mold or after being released from the mold. In addition, the binder may be introduced into the compact by employing a vacuum environment, an appropriate pressure or simply under atmospheric conditions, again depending on the particular application. If the binder is added under a vacuum or a pressure, it will essentially impregnate the entire compact, thereby providing strength, ruggedness and good machinability to the entire compact. If the binder is added under atmospheric conditions it will generally remain near the surface of the compact, which may be useful for limited machining applications. The amount of binder retained within the green compact may further be controlled by employing binder solutions having various binder concentrations.

Therefore, the desired level of strength and ruggedness of an individual unfired, green compact may be tailored specifically for each application, with subsequent machining of the compact being performed on those regions of the compact which were impregnated with the liquid binder. The machined compacts of this invention exhibit enhanced durability with no signs of chipping or cracking, even when the machined shapes are complex.

There are may advantageous features associated with the method of this invention. Most particularly, the compacts formed in accordance with this method wherein the water insoluble binder is introduced into the ceramic compact after compaction but prior to firing, exhibit enhanced strength and machinability as compared to similar compacts formed conventionally wherein the binder is introduced into the powder mixture prior to compaction. The unfired, green compacts of this invention facilitate the formation of complex ceramic components, since the compacts of this invention may be machined into complex shapes without chipping or damage to the compact, prior to the densification and vitrification of the ceramic compact during firing. In addition, depending on the particular application for the ceramic component, the amount and distribution of the binder may be modified accordingly, thereby enhancing the versatility of the compacts and ceramic components formed by this method.

Other objects and advantages of this invention will be better appreciated from the following detailed description.

DETAILED DESCRIPTION OF THE INVENTION

This invention provides a method for forming a machinable, unfired ceramic compact. The unfired compact is the preconsolidated form of a desired ceramic component. According to this method, the unfired, ceramic green compact may be formed by either "dry" or "wet" compaction techniques. For example, if a dry, ceramic powder mixture is employed, the compact may be formed using any of the conventional operations such as dry pressing, high energy compaction or vibratory packing. Alternatively, if a wet powder mixture or slurry is employed, the ceramic powders may be compacted using techniques such as slip casting or filter-pressing, however with these techniques the compact must be first thoroughly dried prior to proceeding with the addition of the binder in accordance with this invention. The drying may be accomplished using conventional techniques.

Generally, the unfired compact is formed to have a shape corresponding nearly to the shape of the desired ceramic component. The compact will be slightly larger to allow for densification during firing of the compact, and also to allow for any machining which may be necessary before or after firing. The ceramic powder mixture used to form the compact may be a single type of powdered ceramic material or a combination of two or more powdered ceramic materials. In addition, a binder may or may not be included within the powdered mixture, as well as appropriate dispersants or other constituents. Any type of ceramic powder that can be shaped into a compact may be employed with this invention, therefore virtually all ceramic powders are available. In the specific examples of this invention, alumina ceramic powders, $Al_2O_3$, have been employed however the teachings of this invention are not to be limited to only the use of alumina. Other appropriate ceramic materials would include other oxides or oxide powders such as magnesia, $MgO$, zirconia, $ZrO_2$, or alternatively silicon carbide, $SiC$, or silicon nitride, $Si_3N_4$, as well as others.

In accordance with this invention, after compaction but before firing, the appropriate binder is introduced into the ceramic compact. The binder is preferably a water insoluble organic binder, such as paraffin wax or an appropriate thermoplastic polymer such as polymethyl methacrylate-styrene. The thermoplastic polymers should have a melting temperature greater than or equal to about 10° C., so as to ensure room temperature melting which would facilitate the handling of the compact since it would be undesirable to unduly heat the compact prior to the addition of the binder. Other water insoluble binders would also be suitable, such as other types of waxes like the natural occurring waxes or the synthetic type waxes like the hydrocarbon type, or polyol etherester or chlorinated naphthalenes. In addition, other water insoluble binders such as main-chain acyclic carbon polymers, main-chain carbocyclic polymers, main-chain acyclic heteroapom polymers, or main-chain heterocyclic polymers, as well as others, could also be employed. It is preferred that the binder be a water insoluble type since water soluble binders are the most common type of binder used within the ceramic powder mixture prior to compaction (if a binder is used at all), and the impregnation of the compact by a water soluble binder would dissolve the compact. However, if a ceramic mixture having no water soluble binder is employed and compacted, then the binder added by this invention may be virtually any type.

The binder is then introduced into the ceramic compact. It is preferred that the binder be in liquid form, either by appropriately heating the binder or by dissolving the binder in an appropriate solvent, so as to ensure uniform and intimate distribution of the binder within the compact, as well as to simplify application of the binder to the compact. The liquified, water insoluble binder may be either locally or uniformly distributed within the compact, depending on the particular application for the ceramic component. If the binder is added to the entire compact, then the compact is preferably immersed within a bath of the liquified binder. The immersion may occur under a vacuum, so as to ensure complete impregnation, or saturation, of the compact by the liquid binder. This technique results in enhanced cohesion and strength throughout the compact and is useful for applications where the compact will be machined throughout and/or significantly handled.

Alternatively, an appropriate pressure may be maintained while immersing the compact within the liquid binder to ensure complete impregnation. If the immersion is carried out under atmospheric conditions, the binder will tend to remain near the surface of the compact, which may be desirable for applications requiring only surface machining.

In addition, the water insoluble binder may be added to a specific localized region of the compact if desired. This is best accomplished by dispensing droplets of the liquified binder to the desired localized regions, although other techniques which dispense the binder to a localized region may be also employed. This technique may be desirable for applications where the compact requires specific, localized machining and handling.

Further, although it is preferred that the compact be impregnated with the liquified binder by immersion within a bath of the liquified binder or by localized dispensing, the compact may also be impregnated with the liquified binder while it is still within the mold used for compaction of the powder mixture. The binder would be introduced into the compact after compaction. This may be more practical for the localized application of the binder, rather than for the overall impregnation of the compact with the binder.

The water insoluble liquified binder may be mixed with an appropriate solvent so as to form a binder solution having various binder concentrations, thereby enabling the amount of binder dispersed and retained within the compact to be varied. Thus, the desired level of strength, ruggedness and machinability of an individual green compact may be optimized specifically for each application. The use of a binder solution may be desirable if uniform, but slightly lower degrees of, strength, ruggedness and machinability are desired throughout the compact. In addition, the use of a binder solution may simplify the subsequent burnout process required for removal of the binder, since less amounts of binder are present within the compact when a binder solution is employed.

A preferred binder solution was prepared by dissolving an appropriate amount of the paraffin wax into the solvent, hexane. Alternatively, a copolymer binder solution was prepared by dissolving polymethyl methacrylate-styrene pellets into toluene. Other suitable solvents for the preferred water insoluble binders described earlier would include any of the general water insoluble solvents, such as the aromatic hydrocarbons including acetone or mineral spirits, as well as other. The binder solution may contain from about one weight percent to about 99 weight percent binder within the solvent, depending on the optimum level of binder required within the compact, since there are essentially no limiting factors. However, a binder solution of less than about one weight percent binder may provide insufficient amounts of the binder throughout the compact, therefore it is preferred to employ a binder solution having at least about one weight percent binder.

The unfired, ceramic compacts which were formed by the method of this invention were characterized by excellent strength and ruggedness with enhanced machinability.

Specific examples of machinable, unfired ceramic compacts formed by the method of this invention are as follows.

EXAMPLE 1

A ceramic compact characterized by a simple, cylindrical shape, about 2.5 centimeters diameter by about two centimeters height, was made by filter-pressing a ceramic powder slurry under approximately 5100 pounds per square inch (psi). The ceramic powder slurry consisted of a commercially available alumina powder (Sumitomo AKP-HP 99.99 percent pure alumina powder) which had been sufficiently mixed with water to form a slurry. The slurry consisted of 55 volume percent alumina powder and the remainder water. After compaction and being release from the mold, the wet compact was dried at room temperature for about two days and then dried at a temperature of approximately 110° C. for about one day to ensure complete drying of the compact.

Commercially available paraffin wax was then melted and the dried alumina compact immersed into the bath of molten wax. The impregnation of the wax was assisted by applying a sufficient vacuum to the bath until the generation of air bubbles from the compact disappeared. After removal from the molten wax, the wax-impregnated compact was cooled at room temperature and became solid. A three dimensional pattern was machined into one of the flat ends of the cylindrical compact. The three dimensional pattern was characterized by grooves of approximately one centimeter height. The machined compact exhibited no signs of chipping or cracking.

EXAMPLE 2

A ceramic compact characterized by the same simple, cylindrical shape, was made by dry pressing a powdered ceramic under approximately 5100 psi. The powdered ceramic was a commercially available alumina powder (Reynolds RC-HP DBM 99.9% pure alumina powder). No drying process was required after the compact was removed from the mold because dry pressing techniques were employed. The paraffin wax was prepared by melting, and the compact impregnated with the molten paraffin wax by immersion, as set forth by the procedure of Example 1.

A complex three dimensional pattern was again successfully machined into one of the flat ends of the cylindrical compact. The three dimensional grooved pattern was characterized by heights of approximately one centimeter. The machined compact exhibited no signs of chipping or cracking.

In addition, the patterned compact was subjected to a burnout process at approximately 500° C. overnight to remove the impregnated wax from the compact. Even after the high temperature burnout, the machined compact showed no evidence of cracks or chips. The patterned compact was then also fired at approximately 1500° C. for densification and vitrification of the alumina ceramic, and again the machined pattern remained essentially defect free.

EXAMPLE 3

Two identical ceramic compacts characterized by the same cylindrical shape were made by filter-pressing a ceramic powder slurry under a pressure of approximately 5100 psi. The ceramic powder slurry consisted of a commercially available alumina powder (Reynolds RC-HP DBM 99.9% pure alumina powder) which had been sufficiently mixed with water to form a slurry. The slurry was formed by mixing 55 volume percent alumina powder with the remainder being water. After compaction and release from the mold, the wet compacts were then thoroughly dried at room temperature for about two days and then at a temperature of approximately 110° C. for about one day.

Commercially available paraffin wax was then melted. One of the dried alumina compacts were impregnated with the wax binder by immersion in the bath of molten wax. The impregnation of the wax was assisted by applying a sufficient vacuum to the bath until the generation of air bubbles from the compact disappeared. The other dried alumina compact was impregnated with the wax binder by immersion in the bath of molten wax for about five minutes at atmospheric conditions.

As determined by thermogravimetric analysis, the first compact had approximately ten weight percent wax uniformly distributed throughout the entire compact. The second compact contained about ten weight percent wax in the vicinity of the surface, but internally there were regions with only about three weight percent wax with the core of the cylindrical compact showing no evidence of impregnation by the wax binder.

EXAMPLE 4

A ceramic compact characterized by the same cylindrical shape was made by filter-pressing a ceramic powder slurry under approximately 5100 psi pressure. The ceramic powder slurry consisted of the commercially available Reynolds RC-HP DBM alumina powder, which had been sufficiently mixed with water to form a slurry. The slurry was 55 volume percent alumina powder with water. After compaction and release from the mold, the wet compacts were thoroughly dried by drying at room temperature for about two days and then drying at a temperature of approximately 110° C. for about one day.

A wax solution containing approximately ten weight percent paraffin wax was prepared by dissolving the paraffin wax into hexane. The dried alumina compact was impregnated with the wax binder by immersion in a bath of the 10 weight percent wax solution. The impregnation of the wax was assisted by applying a sufficient vacuum to the bath until the generation of air bubbles from the compact disappeared.

The volatile hexane was then evaporated from the wax-impregnated compact by exposure to atmosphere. A substantial green strength was observed for this compact, although qualitatively its green strength was determined to be less than that of the compacts impregnated by immersion in the bath of molten wax which were formed according to the previous examples. Simple shapes were successfully machined in this compact, however delicate shapes were essentially not possible due to the reduced strength of this compact.

EXAMPLE 5

A copolymer binder solution was employed by dissolving five weight percent polymethyl methacrylate-styrene in pellet form into toluene. The dried compact prepared according to Example 4 was impregnated with this copolymer binder solution under vacuum. After evaporating the volatile toluene, it strength was qualitatively greater than that of the compact formed according to Example 4, thereby probably exhibiting machinability at least as good as the compact in Example 4 for simple shapes and probably good machinability of delicate shapes.

Generally, the use of the paraffin wax binder solution in Example 4 for impregnating the compact results in a compact having reduced strength as compared to the compacts impregnated by immersion within the molten binder bath (Examples 1 and 2). However, the strength may be improved by the use of a copolymer solution, as set forth in Example 5. It is believed that by employing a binder solution and increasing the binder concentration within the solution, a desired strength could be achieved by optimizing the amount of impregnated binder within the compact so as to impart sufficient strength and machinability to the compact. The use of binder solutions is also advantageous over the use of a molten binder bath, in that the subsequent burnout process required for removal of the binder within the compact is simplified due to the lesser amount of binder within the compact.

In addition, the morphology of the compacts formed in accordance with this invention were studied using scanning electron microscopy techniques to determine whether the impregnation of the compact with the binder and subsequent burnout caused any microstructural damage. Fracture surfaces were studied which were taken from various compacts (a) after compaction and before binder impregnation, (b) after vacuum impregnation of the molten paraffin wax binder, and (c) after binder burnout at about 500° C. It was concluded that the impregnation of the binder within the compact did not change the packing mechanism of the ceramic particles, and that the wax binder only coated the surfaces of the particles leaving open the pore channels for easy burnout of the wax binder. Further, it was determined that the impregnated binder did not penetrate the contact interface between particles, therefore indicating that the original uniform microstructure of the compacted ceramic particles was maintained. This should promote uniformity of microstructure and density within the final fired ceramic component also.

It is also foreseeable that the binder could be a low molecular weight prepolymer or monomer, or any combination of the two types. The binder would be impregnated within the compact in accordance with this method. The reaction for hardening the binder could be polymerization and/or crosslinking arising by bi- or poly-functional monomers, living polymers, and/or initiators. To assist the hardening reactions, different forms of radiation and/or thermal energy could be applied, such as ultraviolet, infrared, x-ray or electron beam exposure. With the use of radiation, especially ultraviolet, surface or local hardening would most probably occur. By employing these types of binder impregnation materials, the burnout process required to remove the binder would also be simplified since the polymerization or cross-linking occurs only at the surface of the component, making the rest of the binder readily removable.

As stated previously, there are many advantageous features associated with this method for forming machinable ceramic compacts. Most particularly, the compacts formed in accordance with this method, wherein the water insoluble binder is introduced into the ceramic compact after compaction but prior to firing, exhibit enhanced strength as compared to conventional compacts wherein the binder is introduced into the powder mixture prior to compaction. The green compacts of this invention may be machined into complex shapes without chipping or damage to the compact. In addition, depending on the particular application or the ceramic component, the amount and distribution of the binder may be modified accordingly, thereby enhancing the versatility of the compacts and ceramic components formed by this method.

Therefore, while our invention has been described in terms of a preferred embodiment, it is apparent that other forms could be adopted by one skilled in the art, such as by substituting different binders or by modifying the processing steps employed. Accordingly, the scope of our invention is to be limited only by the following claims.

The embodiments of the invention in which an exclusive property or privilege is claimed are defined as follows:

1. A method for forming a near-net shape, ceramic component which requires a minimum amount of machining after firing, comprising the following steps:
   compacting a ceramic mixture containing ceramic particles under sufficient pressure so as to form a ceramic compact, said ceramic compact being characterized by sufficient cohesion to retain its shape yet insufficient cohesion to withstand significant amounts of machining;
   liquefying a water insoluble binder wherein said binder is a thermoplastic polymer characterized by a melting temperature greater than or equal to about 10° C.;
   impregnating said ceramic compact with said liquified water insoluble binder, such that said ceramic compact is substantially impregnated with said water insoluble binder so as to be characterized by sufficient strength and cohesion to facilitate machining of said compact;
   machining said impregnated region of said compact so that said machined compact corresponds to the final shape of the desired ceramic component, such that a near-net shape ceramic component which requires only a minimum amount of machining after firing is produced; and
   firing said machined compact at a temperature and for a duration sufficient to densify said ceramic particles, thereby producing a fired ceramic component which is near-net shape so as to require at most a minimal amount of finish machining.

2. A method for forming a near-net shape ceramic component as recited in claim 1 wherein said ceramic particles comprise alumina powder.

3. A method for forming a near-net shape ceramic component as recited in claim 1 wherein said liquefying step includes melting said water insoluble binder.

4. A method for forming a near-net shape ceramic component as recited in claim 1 wherein said liquefying step includes dissolving said water insoluble binder in an aromatic hydrocarbon solvent.

5. A method for forming a near-net shape, ceramic component as recited in claim 1 wherein said impregnation step includes immersing said ceramic compact into a bath of said liquified water insoluble binder.

6. A method for forming a near-net shape ceramic component as recited in claim 1 wherein said impregnation step includes dispersing droplets of said water insoluble binder to said region of said ceramic compact so as to impregnate only said region of said compact.

7. A method for forming a near-net shape ceramic component as recited in claim 1 wherein said impregnating step includes immersing said ceramic compact into a bath of said liquified, water insoluble binder under vacuum.

8. A method for forming a near-net shape ceramic component as recited in claim 1 wherein said bath of said liquified water insoluble binder comprises a mixture of polymethyl methacrylate-styrene in toluene.

* * * * *